3,135,735
AZO PHOSPHORUS COMPOUNDS
Hugo Malz, Leverkusen-Wiesdorf, Otto Bayer, Leverkusen-Bayerwerk, and Helmut Freytag and Engelbert Kühle, Cologne-Stammheim, Germany, assignors to Farbenfabriken Bayer Aktiengesellschaft, Leverkusen, Germany, a corporation of Germany
No Drawing. Filed Oct. 16, 1961, Ser. No. 145,499
Claims priority, application Germany Oct. 15, 1960
11 Claims. (Cl. 260—192)

The present invention relates to and has as its objects new insecticidal compounds of the general Formula I and processes for the production thereof.

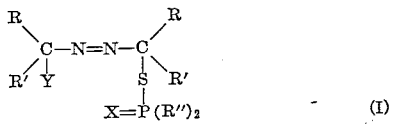

(I)

In this formula R and R' stand for the same or different possibly substituted hydrocarbon residues, R" is an aliphatic or aromatic residue which may be attached to the phosphorus atom via oxygen, sulfur or nitrogen, X stands for oxygen or sulfur and Y for halogen or another residue

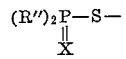

R and R' can also be members of a cycloaliphatic residue.

The inventive new compounds of this type can be produced from thiol- or thionothiol phosphates, phosphonates or phosphinates and a,a'-dihalogen-azo-alkanes according to the following reaction scheme:

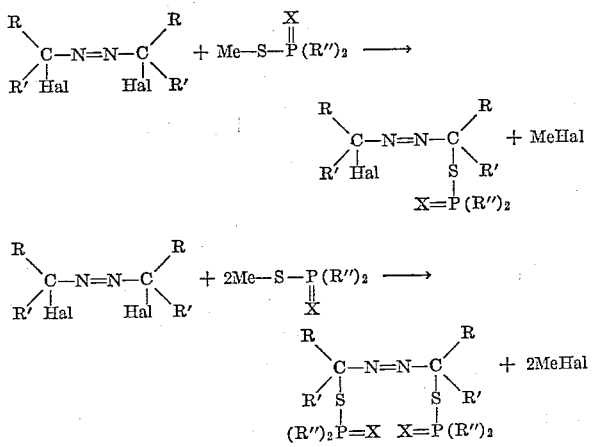

in these formulae, R, R' and R" and X have the above meaning, while Hal stands for halogen and Me for an ammonium, alkali metal or alkaline earth metal equivalent.

R and R' are more particularly alkyl groups which can also be substituted, for example, by halogen atoms, nitro groups, alkoxy groups and the like. R and R' can also form, together with the C-atom, cycloaliphatics. Furthermore, R and R' can also mean aryl groups, for example, the phenyl residue, which can possibly also be further substituted by alkyl groups, halogen atoms, nitro groups and the like. R" stands, for example, for an alkoxy, aryloxy, alkyl-mercapto, aryl-mercapto, amino, alkylamino, dialkylamino, arylamino group and the like. In this case, the compounds obtained are derivatives of phosphoric acids. In the case of derivatives of phosphonic acids, one residue R" is atached to the phosphorus atoms via a carbon atom. In the case of phosphinic acids, both residues R" are attached to the phosphorus atom through a carbon bond. Thus, in such cases, R" is an alkyl group, halogeno-alkyl group, a phenyl group, which can possibly also be further substituted, and the like.

In the case of the above-described reaction, it is preferable to allow solutions of a,a'-dihalogen-azo-alkanes and solutions or suspensions of the corresponding thiophosphates to act upon one another, Per mol of the dihalogen-azo-alkanes there are thereby used either 1 or 2 mols of thiolphosphate, preferably in the form of ammonium, alkali metal or alkaline earth metal salts. As solvents, apart from inert organic solvents, especially water or aqueous mixtures of organic solvents have proved to be especially useful. It is especially advantageous with regard to yield and purity of the compounds when solutions of the dihalogen-azo-alkanes in water-miscible organic solvents are added dropwise to aqueous solutions of the thiolphosphates, whereby, in the case of suitable measurement of the solvent, the finished products separate out as water-insoluble oils or crystals and thus can easily be separated off in pure form. The reaction in water-containing solutions is slightly exothermic, while with the use of organic solvents, the reaction velocity must, in general, be increased by the use of slightly increased temperatures (about 40–70° C.).

The (thiol) phosphates, phosphonates or phosphinates, as well as the a,a'-dihalogen-azo-alkanes to be used as starting products are known from the literature. The latter can easily be produced by the halogenation of corresponding ketazines.

The new compounds are obtained in the form of colourless to pale yellow-green coloured oils or crystals and can be stored under normal conditions for a prolonged period without decomposition. They are to be used as plant protection agents and as intermediates for the production of further compounds.

Especially the inventive compounds may be used in the field of veterinary medicine because of their extremely low mammal toxicity. Especially, they are active against diseases caused by intestinal worms (endoparasites) of cattle, sheep and the like.

Thus, the compound of the following formula

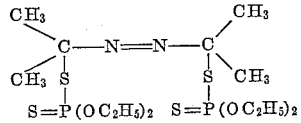

is still tolerated at the efficiency of 3 g./kg. and it kills, for inst., *Haemonchus contortus* at 100% with an amount of 200 mg./kg. of sheep.

Bunostomum is killed in the amount of 400 mg./kg.

*Example 1*

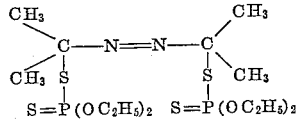

To a solution of 50 g. (0.22 mol.) of O,O-diethylthiolthionophosphoric acid potassium salt in 150 ml. of water, there is added dropwise with stirring a solution of 18.3 g. (0.1 mol.) of 2,2'-dichloro-2,2'-azo-propane in 50 ml. of acetone. The temperature of the mixture slowly increases to about 35° C., while a bright yellow oil separates out. After about ½ hour of stirring, the oil is separated off, taken up in ether and the ether solution washed with water. After drying over sodium sulfate, the ether is removed, a bright yellow oil being obtained which crystallizes after a short time. M.P. 33–35° C. after recrystallization from alcohol.

Calc. for $C_{14}H_{32}O_4N_2P_2S_4$: N, 5.8%; P, 12.9%, S, 26.6%. Found: N, 5.8%; P, 13.0%; S, 26.4%.

Example 2

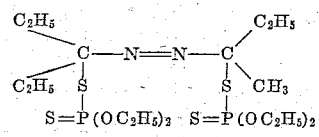

When a solution of 23.9 g. of 3,3'-dichloro-3,3'-azopentane in 50 ml. of acetone is allowed to act on an aqueous solution of 50 g. of O,O-diethyl thiolthionophosphoric acid potassium salt in the manner described in Example 1, there is obtained a yellow-green, clear oil in about 90% yield which crystallizes upon standing. After redissolving from alcohol, bright yellow crystals are obtained which melt at 41° C.

Toxicity: 3 g./kg., no effect.

Haemonchus contortus: 300 mg./kg., 100% activity.

Example 3

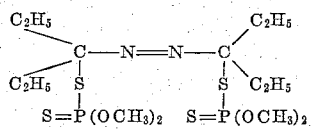

To a solution of 45 g. of O,O-dimethyl thiolthionophosphoric acid potassium salt in 100 ml. of water there is added dropwise with stirring a solution of 23.9 g. of 3,3'-dichloro-3,3'-azo-pentane in 50 ml. of acetone followed by working up as described in Example 1. Colorless crystals are thereby obtained which; after recrystallization from methanol, melt at 86–88° C.

Example 4

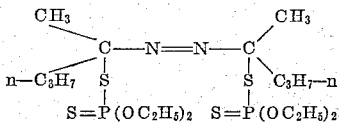

To a solution of 44.8 g. of O,O-diethyl thiolthionophosphoric acid potassium salt in 100 ml. of acetone there is added dropwise with stirring a solution of 23.9 g. of 2,2'-dichloro-2,2'-azo-pentane in 75 ml. of acetone. The colorless, clear reaction mixture is subsequently heated to boiling for about ½ hour, whereby potassium chloride precipitates out and the solution becomes brown-yellow colored. After separation of the precipitated potassium chloride, the reaction mixture is evaporated in a vacuum whereby a bright yellow oily residue is obtained which crystallizes upon cooling. After redissolving from alcohol, pale yellow colored crystals are obtained, M.P. 61° C. The same compound is obtained when an aqueous acetone solution is used as in Example 1. In this case, the yield amounts to about 90% of the theoretical compared with 75% in the case of working in anhydrous acetone.

By the same way there may be obtained the following compounds:

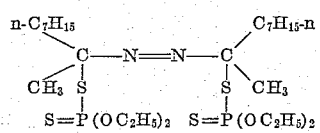

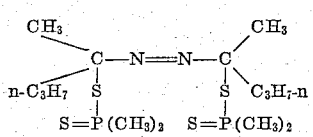

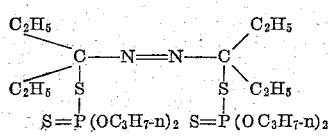

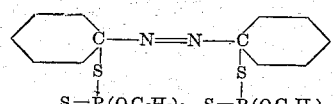

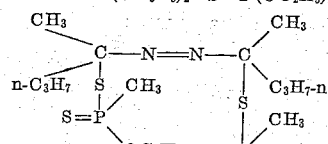

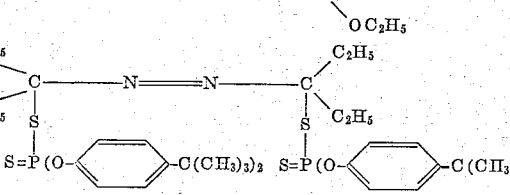

Example 5

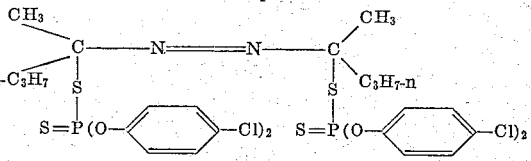

To an approximately 30% aqueous solution of 42 g. of O,O-di-p-chlorophenyl thiolthionophosphoric acid potassium salt there is added dropwise with stirring a solution of 12 g. of 2,2'-dichloro-2,2'-azo-pentane in 50 ml. of acetone and subsequently stirred for about ½–¾ hour until the weakly exothermic reaction subsides. 150 ml. of water are subsequently added to the reaction mixture, the brown oil which separates out is removed and taken up in ether. The ethereal solution is well washed with water, dried over sodium sulphate and evaporated. A viscous clear brown oil is obtained, yield 38 g.

Example 6

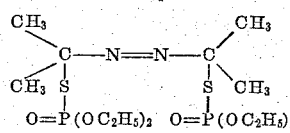

To a solution of 34.4 g. of O,O-diethyl thiolphosphoric acid ammonium salt in 150 ml. of acetone there is added dropwise a solution of 18.8 g. of 2,2'-dichloro-2,2'-azo-propane in 50 ml. of acetone. The initially colorless clear reaction mixture is subsequently heated to boiling for about ½ hour, whereby ammonium chloride separates out. After separating off the ammonium chloride, the red-brown filtrate is evaporated in a vacuum, whereby a red-brown oil remains behind which is suction filtered through a frit to become clear.

By the same way there may be obtained the following compounds:

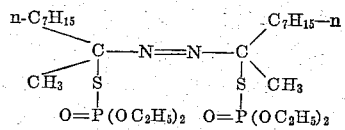

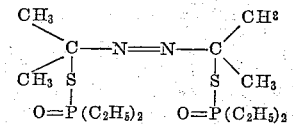

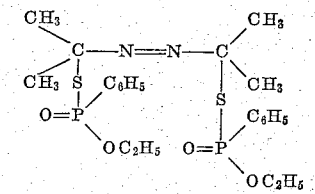

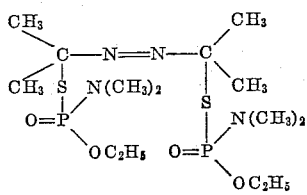

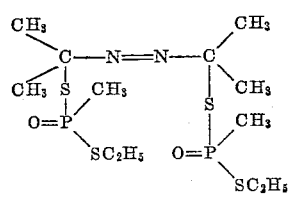

*Example 7*

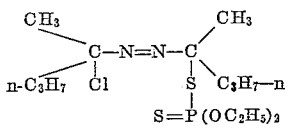

12 g. of 2,2'-dichloro-2,2'-azo-pentane are dissolved in 75 ml. of acetone. To the solution heated to about 50° C., there is added dropwise with vigorous stirring a solution of 11.2 g. of O,O-diethyl thiolthionophosphoric acid potassium salt in 75 ml. of acetone while heating the reaction mixture to boiling. After further stirring at boiling temperature for about ½ hour, the separated potassium chloride is filtered off with suction and the bright yellow clear filtrate evaporated in a vacuum. About 15 g. of clear bright yellow oil are thereby obtained.

By the same way there may be obtained the following compounds:

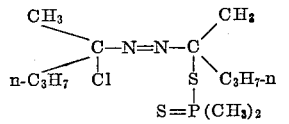

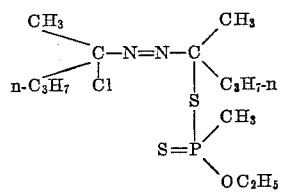

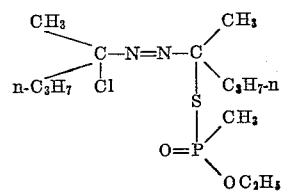

We claim:
1. A compound of the formula

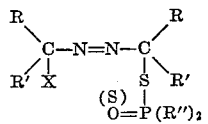

in which R and R' stand for members selected from the group consisting of alkyl groups up to 10 carbon atoms, in which R and R' together with an adjacent carbon atom may form a six-membered cycloaliphatic ring system, R'' stands for a member, selected from the group consisting of a lower alkyl group, a lower alkoxy group, a phenyl group, a phenoxy group, a chloro- and an alkyl-substituted phenoxy-group, in which X stands for a member, selected from the group consisting of a chlorine atom and another

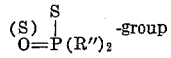

2. A compound of claim 1 wherein R and R' are each alkyl having up to 10 carbon atoms and X is another

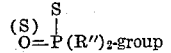

R'' being lower alkoxy.

3. A compound of claim 1 wherein R and R' are each alkyl having up to 10 carbon atoms and X is another

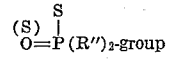

R'' being a phenyl group.

4. A compound of claim 1 wherein R and R' are each alkyl having up to 10 carbon atoms, R'' is lower alkoxy and X is a chlorine atom.

5. The compound of the following formula

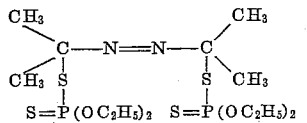

6. The compound of the following formula

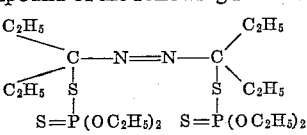

7. The compound of the following formula

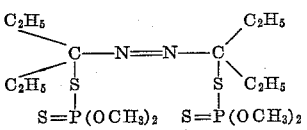

8. The compound of the following formula

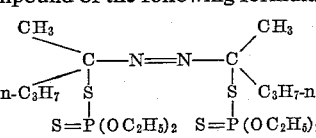

9. The compound of the following formula

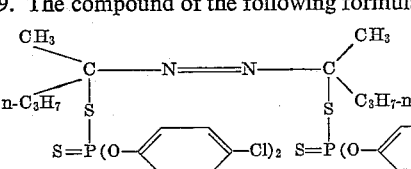

10. The compound of the following formula

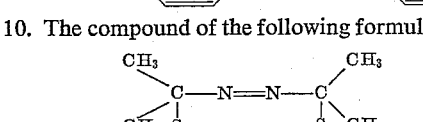

11. The compound of the following formula

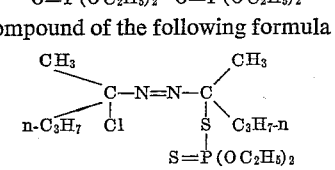

No references cited.